United States Patent [19]

Okumura et al.

[11] Patent Number: 4,690,764
[45] Date of Patent: Sep. 1, 1987

[54] AERATOR AND AEROBIC BIOLOGICAL TREATMENT PROCESS USING SAME

[75] Inventors: Munehiro Okumura, Hoya; Takao Nomura, Matsudo; Tadashi Matsuda; Shojiro Kido, both of Yokohama; Shinichi Ishii, Hachiouji; Hideki Hattori, Tokyo, all of Japan

[73] Assignee: Mitsubishi Rayon Engineering Co., Ltd., Tokyo, Japan

[21] Appl. No.: 916,730

[22] Filed: Oct. 8, 1986

[30] Foreign Application Priority Data

Oct. 11, 1985 [JP] Japan .............................. 60-224802

[51] Int. Cl.$^4$ .............................................. C02F 3/20
[52] U.S. Cl. .................................... 210/629; 210/220; 261/77; 261/DIG. 75
[58] Field of Search ............... 210/620, 629, 758, 199, 210/220, 221.2; 261/76, 77, 121 R, DIG. 70, DIG. 75

[56] References Cited

U.S. PATENT DOCUMENTS

| 3,853,271 | 12/1974 | Freshour et al. | 261/DIG. 75 |
| 4,019,983 | 4/1977 | Mandt | 261/76 X |
| 4,162,970 | 7/1979 | Zlokarnik et al. | 261/77 X |
| 4,162,971 | 7/1979 | Zlokarnik et al. | 210/220 X |
| 4,224,158 | 9/1980 | Molvar | 210/220 |
| 4,226,719 | 10/1980 | Woltman | 210/220 |
| 4,308,138 | 12/1981 | Woltman | 210/220 |
| 4,645,603 | 2/1987 | Frankl | 210/629 |

Primary Examiner—Tom Wyse
Attorney, Agent, or Firm—Oblon, Fisher, Spivak, McClelland & Maier

[57] ABSTRACT

This invention provides an aerator comprising a jet stream generator for ejecting a gas and a liquid in a mixed state from a nozzle, and a tubular flow straightener for mixing the bubble-containing stream ejected from the nozzle with ambient water and discharging the resulting mixture from the discharge orifice thereof, characterized in that the flow straightener has a tubular form whose internal diameter is reduced from the inlet toward the discharge orifice through at least a part of its length.

This aerator can produce a stream containing minute gas bubbles, even when a gas is supplied thereto in such a large amount as to give a gas-to-liquid volume ratio of 3/1.

7 Claims, 10 Drawing Figures

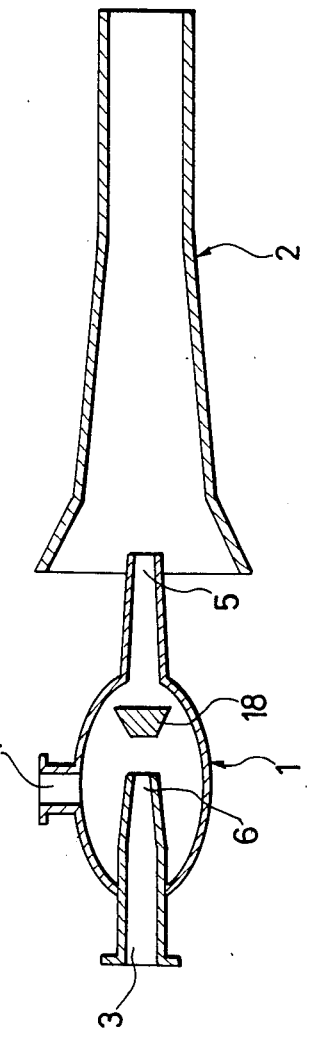
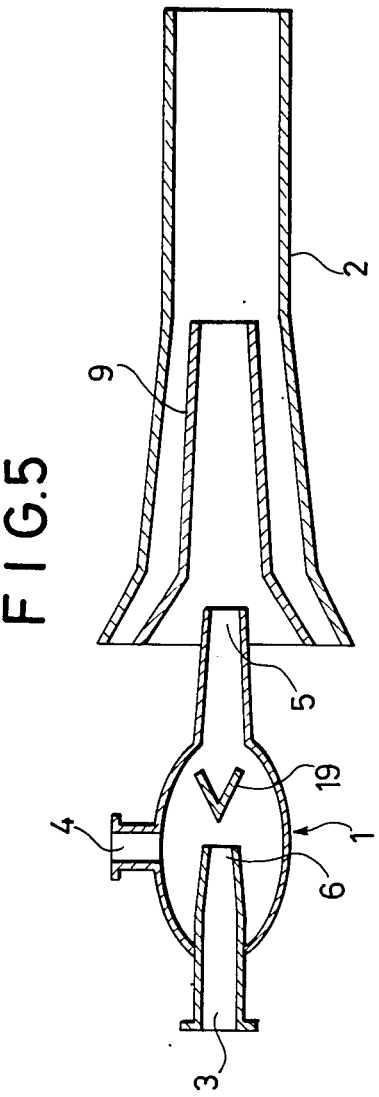

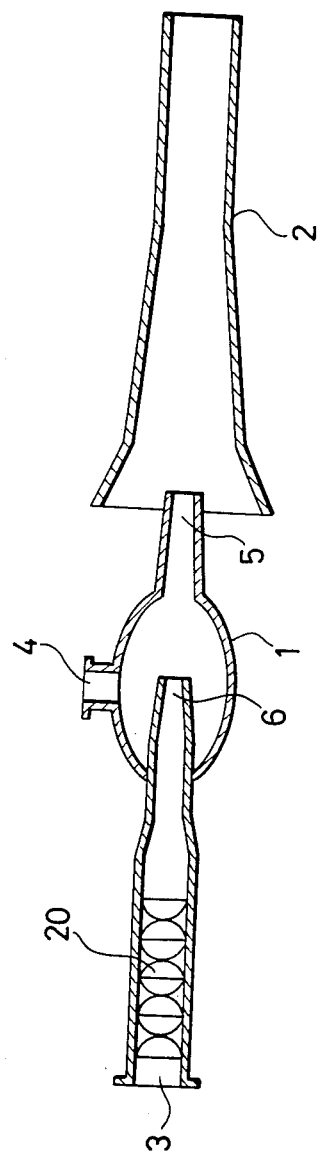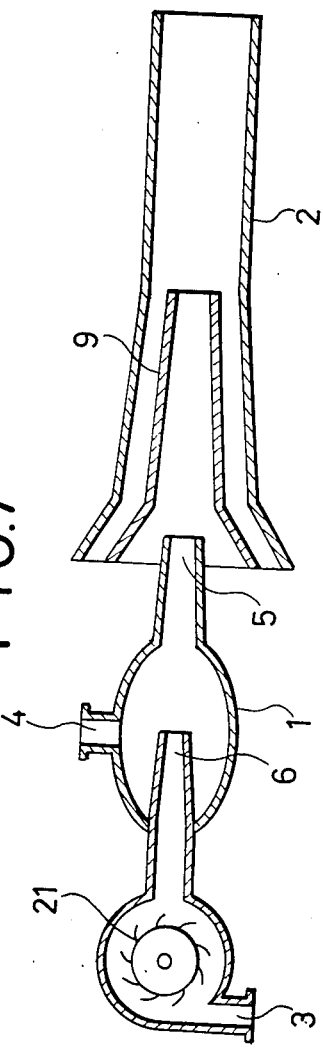

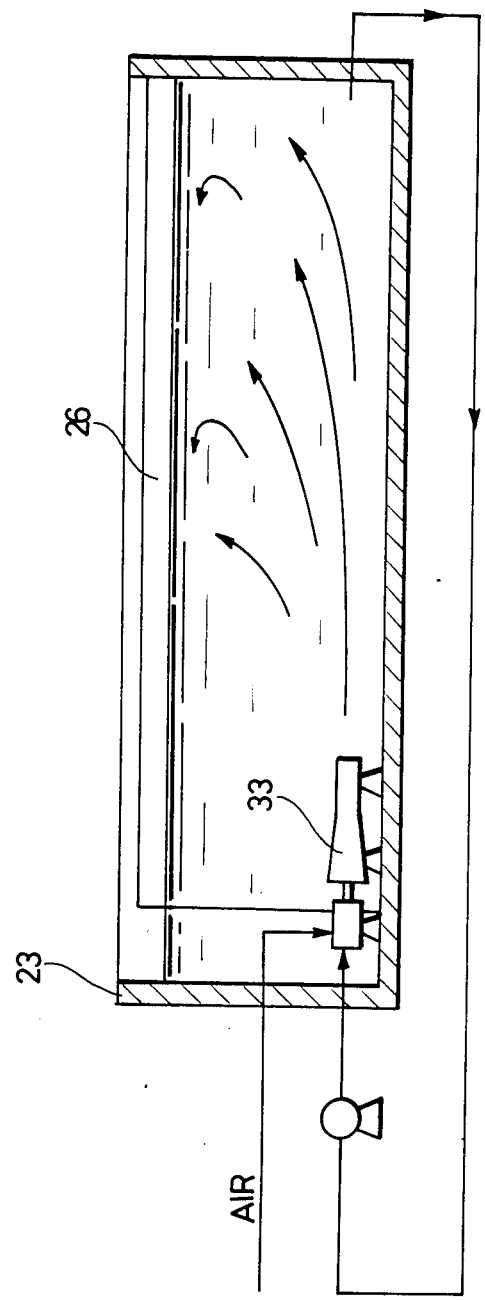

AERATOR AND AEROBIC BIOLOGICAL TREATMENT PROCESS USING SAME

BACKGROUND OF THE INVENTION

1. Field of the Invention

This invention relates to apparatus for dispersing and dissolving a gas in a liquid and, in particular, an aerator adapted to ejecting atmospheric oxygen in the form of a bubble-containing stream and thereby dissolving it in ambient water, as well as a process for the aerobic biological treatment of, for example, organic waste water, various liquid media used in biotechnology, and lake water by using such an aerator.

2. Description of the Prior Art

Conventionally known apparatus for dissolving a gas in a liquid include, for example, an apparatus for dissolving atmospheric oxygen in water which comprises air diffuser pipes disposed in a water tank for blowing air through the water; an apparatus for dissolving atmospheric oxygen in water which comprise an ejecter mechanism for mixing air with water in advance and then ejecting the resulting mixture (as described, for example, in Japanese Utility Model No. 42560/'82 and Japanese Patent Publication No. 41290/'82).

However, when an apparatus of the air diffuser pipe type is used, relatively large air bubbles (with a diameter of ten to several tens of millimeters) are formed. For this reason, the dissolution efficiency of atmospheric oxygen (i.e., the proportion of the amount of oxygen dissolved to the amount of oxygen supplied) is so low that the maximum oxygen dissolution efficiency is as low as about 7% and, therefore, the water within the tank having air diffuser pipes disposed therein has a very low average oxygen concentration. On the other hand, an apparatus of the ejector type can discharge relatively minute air bubbles in the form of a horizontal stream. Accordingly, as compared with processes using air diffuser pipes or mechanical aeration, the oxygen dissolution efficiency is relatively high and air can be relatively, uniformly dispersed throughout the water being treated. However, conventional ejectors have the disadvantage that a stream containing minute air bubbles can be produced only when the mixing ratio of air to water is about 1/1 or lower. As the amount of air supplied is increased, the diameter of the resulting air bubbles becomes larger and these air bubbles become more liable to coalesce into even larger air bubbles, so that the dispersion of air bubbles in the water becomes very poor and the oxygen dissolution efficiency is reduced. For this reason, it has been impossible to supply a gas in sufficiently large amounts.

SUMMARY OF THE INVENTION

It is an object of the present invention to provide an aerator which, even when a gas is supplied thereto in such a large amount as to give a gas-to-liquid volume ratio of 3/1, can produce a stream containing minute gas bubbles without causing coalescence thereof.

It is another object of the present invention to provide a process for the aerobic biological treatment of waste water by using an aerator in which minute air bubbles are supplied uniformly throughout the waste water to achieve a high oxygen dissolution efficiency, the water stream brings about effective agitation of the waste water and efficient contact between microorganisms and pollutants, and the waste water can consequently be treated with high efficiency.

According to the present invention, there is provided an aerator comprising a jet stream generator for ejecting a gas and a liquid in a mixed state from a nozzle, and a tubular flow straightener for mixing the bubble-containing stream ejected from the nozzle with ambient water and discharging the resulting mixture from the discharge orifice thereof, characterized in that the jet stream generator has a liquid inlet, at least one gas inlet, an outer nozzle and at least one inner nozzle, the liquid inlet communicates with the internal space of the jet stream generator by way of the inner nozzle, said flow straightener has a tubular form whose internal diameter is reduced from the inlet toward the discharge orifice through at least a part of its length, and the outer nozzle is disposed so as to be substantially coaxial with the flow straightener and to have its tip located in the neighborhood of the inlet of the flow straightener.

According to the present invention, there is also provided a process for the aerobic biological treatment of waste water placed in a tank which comprises the steps of (a) providing an aerator comprising a jet stream generator for ejecting a gas and a liquid in a mixed state from a nozzle, and a tubular flow straigntener for mixing the bubble-containing stream ejected from the nozzle with ambient water and discharging the resulting mixture from the discharge orifice thereof, characterized in that the jet stream generator has a liquid inlet, at least one gas inlet, an outer nozzle and at least one inner nozzle, the liquid inlet communicates with the internal space of the jet stream generator by way of the inner nozzle, the flow straightener has a tubular form whose internal diameter is reduced from the inlet toward the discharge orifice through at least a part of its length, and the outer nozzle is disposed so as to be substantially coaxial with the flow straightener and to have its tip located in the neighborhood of the inlet of the flow straightener;

(b) installing the aerator within the tank in such a way that the aerator is located at least 2 meters below the water surface and the discharge orifice of the flow straightener is located at a distance of not less than 3 meters from the opposite wall of the water tank as measured in the direction of flow of the bubble-containing stream discharged from the discharge orifice;

(c) disposing two partitions within the tank in such a way that the partitions are substantially parallel to the bubble-containing stream discharged from the discharge orifice, the partitions define a section having a width of not greater than 5 meters, and the aerator is located substantially equidistantly from the partitions; and (d) supplying a gas and a liquid to the aerator so as to produce a bubble-containing stream having a flow velocity of not less than 1.5 meters per minute at the discharge orifice.

BRIEF DESCRIPTION OF THE DRAWINGS

FIGS. 3 to 7 are schematic sectional views illustrating several modified embodiments of the aerator of the present invention;

FIG. 10 is a schematic sectional view of the tank illustrated in FIG. 9.

DESCRIPTION OF THE PREFERRED EMBODIMENTS

The aerator of the present invention will be more specifically described with reference to the accompanying drawings.

Figure 1:
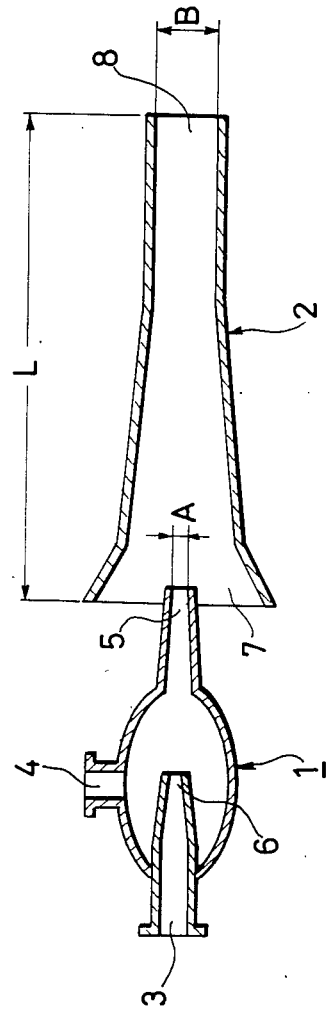
FIGS. 1 and 2 are schematic sectional views illustrating two basic embodiments of the aerator of the present invention.
Figure 2:
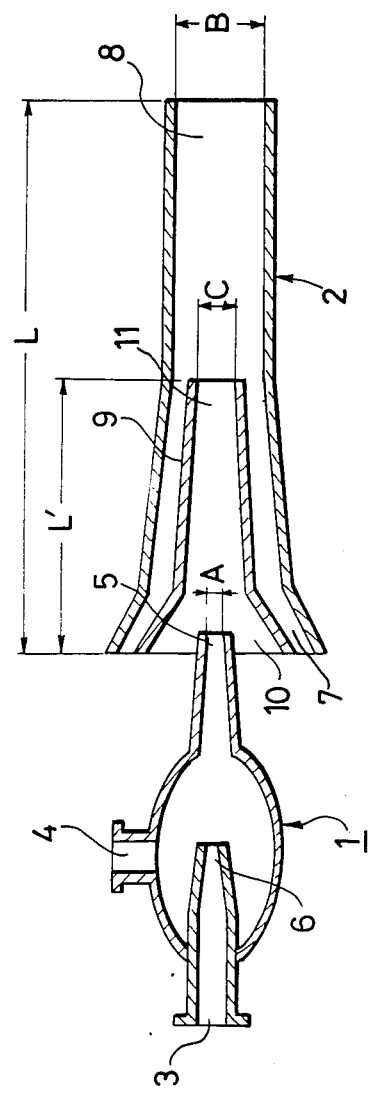

FIGS. 1 and 2 are schematic sectional views illustrating two basic embodiments of the aerator of the present invention. FIG. 1 illustrates an embodiment in which the flow straightener comprises a single tube, and FIG. 2 illustrates one in which the flow straightener comprises a double tube.

The aerator of the present invention consists of a jet stream generator 1 and a flow straightener 2. The jet stream generator 1 has a liquid inlet 3, a gas inlet 4, an outer nozzle 5 and an inner nozzle 6, and the inner nozzle 6 is located within the jet stream generator 1. The liquid inlet 3 communicates with the internal space of the jet stream generator 1 by way of the inner nozzle 6.

Although each nozzle may comprise a narrow, straight tube, it preferably has a portion whose internal diameter is continuously reduced toward the tip. In the illustrated embodiments, although the nozzles are disposed in such a way that they point in the same direction and align with each other, this disposition is not necessarily required. For example, the nozzles may be disposed so as to form an angle of 120° with each other.

A liquid to be supplied to the jet stream generator 1 is introduced through the liquid inlet 3 and then injected through the inner nozzle 6 into the internal space of the jet stream generator 1. Thus, the liquid is usually supplied at a pressure of 1 to 40 kg/cm$^2$G and preferably 1.5 to 25 kg/cm$^2$G. Although the gas inlet 4 is an inlet for introducing an oxygen-containing gas such as air, pure oxygen, or oxygen-enriched air, water having oxygen dissolved therein at a high concentration may be introduced therethrough. The liquid injected through the inner nozzle 6 and the gas supplied through the gas inlet 4 are mixed together within the jet stream generator to form a liquid containing minute gas bubbles. This bubble-containing liquid is ejected from the outer nozzle 5 to the outside of the jet stream generator 1.

When the liquid is supplied to the jet stream generator at a pressure of 5 to 40 kg/cm$^2$G and the gas is supplied thereto at a pressure of 0.2 to 0.7 kg/cm$^2$G, the gas is satisfactorily dispersed and dissolved in the liquid. As a result, the liquid discharged from the flow straightener contains very minute gas bubbles (with a diameter of 1 mm or less) and permits these minute gas bubbles to be dispersed throughout of the waste water within the tank.

The flow straightener 2 comprises a tube having open ends, and its internal diameter is largest at the inlet 7 and is reduced from the inlet 7 toward the discharge orifice 8 through at least a part of its length. More specifically, the internal diameter may be continuously reduced all the way from the inlet 7 to the discharge orifice 8, or only in a portion extending from the inlet 7 to an intermediate point. In the latter case where the internal diameter is continuously reduced in a portion extending from the inlet 7 to an intermediate point, the internal diameter of the remaining portion may remain constant or, on the contrary, may even increase. The length of the portion in which the internal diameter is continuously reduced from the inlet 7 should preferably be not less than ¼, more preferably about ⅔ to ⅓, of the overal length, L, of the flow straightener.

It is very important that the flow straightener 2 have a tubular form whose internal diameter is continuously reduced from the inlet 7 toward the discharge orifice 8 through at least a part of its length, and this tubular form makes it possible to maintain the minuteness of gas bubbles without causing coalescence thereof, even when the mixing ratio of the gas to the liquid is raised to the order of 2/1 to 3/1. The internal diameter of the inlet 7 of the flow straightener 2 should preferably be about 1.4 to 4 times as large as the smallest internal diameter, B, of the flow straightener 2.

The flow straightener can be made of any of various materials. Although its inner surfaces may be somewhat rough, it is preferable that the flow straightener have as smooth an inner surface as possible. Especially for the portion having the smallest internal diameter, the degree of surface roughness exerts a great influence on the state of the gas bubbles present in the bubble-containing stream.

The positional relationship between the jet stream generator 1 and the flow straightener 2 should be such that the outer nozzle 5 is disposed so as to be substantially coaxial with the flow straightener 2 and to have its tip located in the neighborhood of the inlet 7 of the flow straightener. The tip of the outer nozzle 5 need not be inserted deep in the internal space of the flow straightener, but has only to be located in such a position that all of the bubble-containing stream ejected from the outer nozzle 5 is received by the flow straightener. In an extreme case, the tip of the outer nozzle may be located immediately on the outside of the inlet of the flow straightener. However, it is usually suitable to disposed the outer nozzle so as to have its tip located immediately on the inside of the inlet 7 of the flow straightener.

In this aerator, when the internal diameter of the outer nozzle 5 of the jet stream generator 1 is represented by A and the smallest internal diameter of the flow straightener is represented by B, it is preferable that A/B have a value of 0.1 to 0.5 and that the overall length, L, of the outer nozzle be in the range of 20A to 100A.

If A/B has a value of less than 0.1, the flow velocity of the bubble-containing stream discharged from the discharge orifice 8 will slow down and the force to suck in ambient water will become weak, so that the bubble-dispersing effect will be lost and the diameter of the resulting gas bubbles will tend to increase. On the other hand, if A/B has a value of greater than 0.5, the formation of eddies within the flow straightener 2 will increase and the gas bubbles will tend to collide with one another and grow.

If the overall length L is less than 20A, the flow straightener 2 will fail to fully perform the functions of mixing gas bubbles with ambient water intimately to prevent coalescence of gas bubbles and of eliminating the local peaks of dissolved oxygen concentration to improve the oxygen dissolution efficiency. On the other hand, if the overall length L is greater than 100A and the flow straightener is unnecessarily long, the coalescence of gas bubbles will tend to occur again and the bubble-containing stream discharged from the discharge orifice 8 will have an unacceptably low flow velocity.

Although the flow straightener may comprise a single tube as described above, a flow straightener having a double tubular form as illustrated in FIG. 2 can also be used. In this case, the main body or outer tube 2 of the flow straightener has a tubular form as described above, and the inner tube 9 comprises an open-ended tube having a shape similar to that of the outer tube 2. The outer tube 2 and the inner tube 9 are disposed in such a way that the inner tube 9 is substantially coaxial with the outer tube 2 and the inlet 10 of the inner tube is substantially flush with the inlet 7 of the outer tube, as illustrated in FIG. 2. When the smallest internal diameter of the inner tube is represented by C, it is preferable that C/B have a value of 0.5 to 0.75 and that the overall length, L', of the inner tube be smaller than the overall length, L, of the outer tube and in the range of 10A to 50A. A flow straightener having this double tubular form has an advantage over that illustrated in FIG. 1, in that the bubble-containing stream can be discharged over a longer distance.

Basically, the aerator of the present invention has the above-described construction. However, various modifications and/or the provision of auxiliary means may be made in order to form more minute gas bubbles and to improve the oxygen dissolution efficiency.

Figure 3:
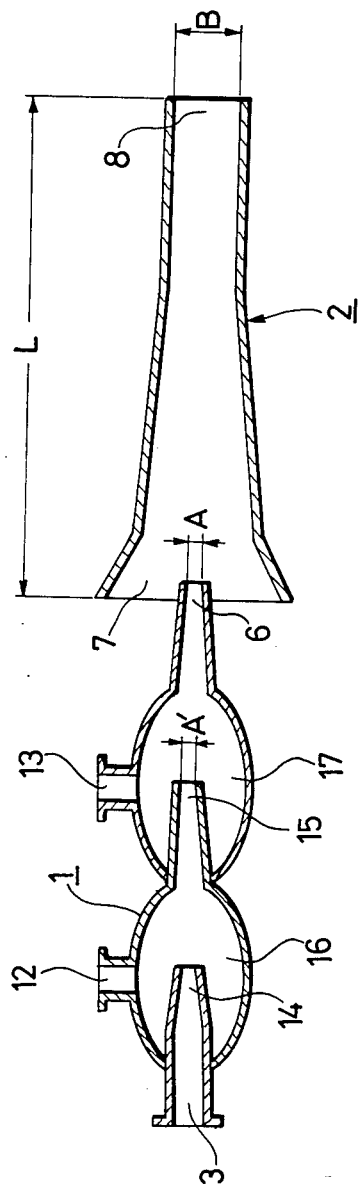

In one preferable modified embodiment, the jet stream generator is provided with a plurality of inner nozzles arranged in series. FIG. 3 illustrates an embodiment in which two inner nozzles are arranged in series. In this case, the jet stream generator 1 has a liquid inlet 3, first and second gas inlets 12, 13, an outer nozzle 5, and first and second inner nozzles 14, 15. The internal space of the jet stream generator 1 is divided by the second inner nozzle 15 into a first chamber 16 and a second chamber 17. The first chamber 16 communicates with the first gas inlet 12 and also communicates with the liquid inlet 3 by way of the first inner nozzle 14. The second chamber 17 communicates with the second gas inlet 13 and the outer nozzle 5. The liquid supplied through the first inner nozzle 14 and the gas supplied through the first gas inlet 12 are mixed together in the first chamber 16 to form a liquid containing minute gas bubbles. This bubble-containing liquid is injected through the second inner nozzle 15 into the second chamber 17, where it is mixed with the gas supplied through the second gas inlet 13 to form a liquid containing more minute gas bubbles. Then, this bubble-containing liquid is ejected from the outer nozzle 5 to the outside of the jet stream generator 1.

When the internal diameter of the tip of the second inner nozzle is represented by A' and the internal diameter of the outer nozzle is represented by A, it is preferable that A'/A have a value of not greater than 1. If this ratio is greater than 1, the effect of the inner nozzles arranged in series will be diminished. If this ratio is 0.8 or less, the gas-dissolving effect in the first chamber will be enhanced and the gas will be more intimately mixed with the liquid in the second chamber, so that the bubble-containing stream discharged from the flow straightener will become more homogeneous.

Although the embodiment using two inner nozzles arranged in series has been described above, it is also possible to provide the jet stream generator with three or more inner nozzles arranged in series.

In other preferable modified embodiments of the aerator, a baffle is disposed within the jet stream generator as illustrated in FIGS. 4 and 5. The mechanism of action of the baffle 18 or 19 is such that the liquid, which has been supplied through the liquid inlet 3 and injected through the inner nozzle 7 into the internal space of the jet stream generator 1 and have just undergone a certain degree of pressure release, collides with the baffle 18 or 19 to produce eddies in the internal space of the jet stream generator 1, and the gas supplied through the gas inlet 4 is introduced into these eddies to achieve more intimate mixing of the gas and the liquid. The provision of this baffle can significantly enhance the mixing effect of the jet stream generator. Moreover, the jet stream generator functions not only to mix the gas with the liquid and thereby form a stream containing minute gas bubbles, but also to dissolve the gas in the liquid. The provision of this baffle also forms a slit between the inner nozzle and the outer nozzle, so that the function of dispersing and dissolving the gas in the liquid can be enhanced by the action of the slit. Where the aerator is used in biological treatment processes, the liquid supplied through the liquid inlet may comprise raw waste water containing suspended solid matter. Especially in this case, the aerator may fail to mix the gas intimately with the liquid, and this makes it difficult to form a stream containing minute gas bubbles. However, the provision of a baffle permits the aerator to form a stream containing minute gas bubbles over a wide range of mxing ratios of the gas to the liquid.

As the baffle, there may be used a member having any of various shapes. However, it is preferable to use a member having the shape of a cone or truncated cone whose apex points to the inner nozzle. The baffle is suitably disposed substantially midway between the tip of the inner nozzle and the inlet of the outer nozzle.

FIGS. 6 and 7 illustrate two embodiments in which fragmentation means 20 or 21 is disposed between the liquid inlet 3 and the inner nozzle 5 of the jet stream generator. As described above, where the aerator of the present invention is used in the treatment of organic waste water, it is often desirable to use the waste water as the liquid supplied to aerator. However, waste water generally contains coarse particles such as flocs of microorganisms or pollutants. If a liquid containing these coarse particles is supplied to the aerator, some of the particles will be relatively easily fragmented, but others will remain coarse. These coarse particles not only gather gas bubbles around them and thus make it difficult to form a stream containing minute gas bubbles, but also adhere to the edges of the nozzles and cause various problems. On the contrary, if these coarse particles are broken into fragments having a size of the order of 0.1 to 2 mm and then supplied to the jet stream generator, oxygen dissolves in the nuclei of these fragments, thus serving to form more minute gas bubbles and contributing to an increase in dissolved oxygen.

Accordingly, the fragmentation means 20 or 21 is provided in order to form more minute gas bubbles and to cause an increase in dissolved oxygen by fragmenting the coarse particles present in the liquid supplied through the liquid inlet and subsequently conducting this liquid to the inner nozzle of the jet stream generator and forward.

For this purpose, there may be used any fragmentation means that, in a strong stream of liquid, can exert a shearing force on the coarse particles present in the liquid through collision therewith. Although a static mixer 20 is used as the fragmentation means in the embodiment illustrated in FIG. 6, any other fragmentation means of the static type, such as Raschig rings or randomly bent wires, may also be used. In the embodiment illustrated in FIG. 7, an impeller 21 capable of producing eddies is used as the fragmentation means. Thus, any fragmentation means of the mobile type may also be used.

The fragmentation means 20 or 21 not only serves to break coarse particles of, for example, microorganisms and inorganic components into fragments, but also functions effectively to disperse various materials added to the treatment tank during the biological treatment process of waste water, such as nutrients for microorganisms composed mainly of nitrogen and phosphorus, inorganic materials and flocculants for the acceleration of sedimentation, and modified bacterial preparations for the improvement of water-treating effects.

The aerator of the present invention is not only useful as an apparatus for dissolving oxygen in a liquid in the aerobic biological treatment of, for example, organic waste water, various liquid media used in biotechnology, and lake water, but is also effectively applicable to the dissolution of ozone in sterilization processes, the dissolution of oxygen in solutions containing a reducing substance, and the supply of oxygen to nutrient solutions for use in hydroponic culture, among others.

When the mixing ratio of air to water is 1/1 or higher, conventional ejectors have been disadvantageous in that it is difficult to discharge and disperse minute air bubbles, and so most of the air bubbles coalesce and escape to the atmosphere, and in that minute air bubbles can be dispersed only over a relatively short distance from the tip of the ejector. In contrast, the aerator of the present invention does not have these disadvantages, even when the mixing ratio of air to water is 1/1 or higher. Thus, over a wide range of mixing ratios of air to water, the aerator of the present invention can disperse very minute air bubbles over an appreciably long distance and thereby achieve a high oxygen dissolution efficiency. The aerator of the present invention is further characterized in that the concentration of dissolved oxygen can be widely controlled by varying the amount and pressure of the water supplied to the jet stream generator and the amount and pressure of the gas introduced through the gas inlet, depending on the characteristics of the waste water to be treated.

The aerator of the present invention is preferably used for purposes of aerobic biological treatment. In this case, a desirable aerobic biological treatment characterized by a high oxygen dissolution efficiency and a uniform distribution of dissolved oxygen can be achieved by appropriately determining the dimensions of the tank in which the aerator is installed, the position at which the aerator is installed, and the flow velocity of the bubble-containing stream discharged from the aerator.

Now, the aerobic biological treatment process of the present invention will be described hereinbelow.

In the process of the present invention, an aerator as described above is used by installing it at a depth of not less than 2 meters below the water surface. As used herein, the "depth" at which the aerator is installed means the distance between the water surface and the longitudinal axis of the flow straightener. Since the minute air bubbles just discharged from the aerator have a high partial pressure of oxygen, the amount of oxygen dissolved in the waste water increases in proportion to the time of contact between the air bubbles and the waste water. If the aerator is installed at a depth of less than 2 meters below the water surface, it is easy to increase the horizontal flow velocity of the bubble-containing stream discharged from the aerator and thereby intensify the apparent agitating force. However, the diameter of the air bubbles tends to increase because of low hydrualic pressure, and the air bubbles escape to the water surface more rapidly. Thus, the oxygen dissolution efficiency is liable to decrease and the concentration of dissolved oxygen cannot easily be made uniform.

Moreover, in carrying out the process of the present invention, the tank containing the waste water to be treated is partitioned into a plurality of sections having specific dimensions. More specifically, one or more partitions are disposed in the tank to form a plurality of sections substantially parallel to each other and having a width of not greater than 5 meters. In each of these sections, an aerator is installed in such a way that it is located equidistantly from the partitions (which can be the sidewalls of the tank), a bubble-containing stream is discharged therefrom in a direction substantially parallel to the partitions, and the discharge orifice 8 is located at a distance of not less than 3 meters from the opposite sidewall of the tank as measured in the direction of the bubble-containing stream. It is preferable that the distance between the aerator and the sidewall of the tank behind it be as short as possible.

Figure 8:
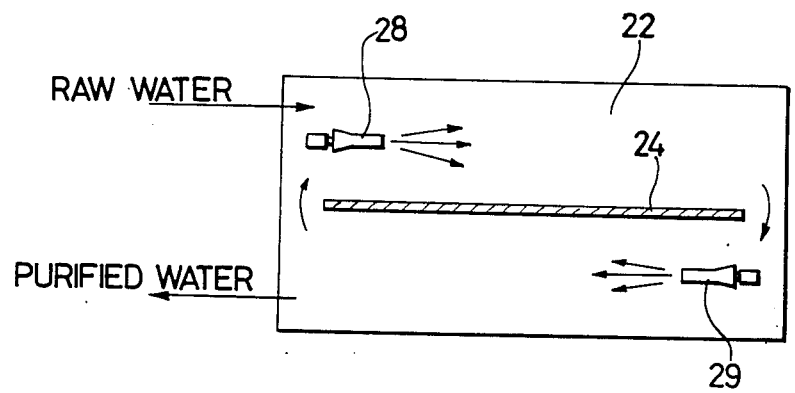
FIGS. 8 and 9 are schematic plan views of a tank which is divided into a plurality of sections by one or more partitions according to the process of the present invention.
Figure 9:
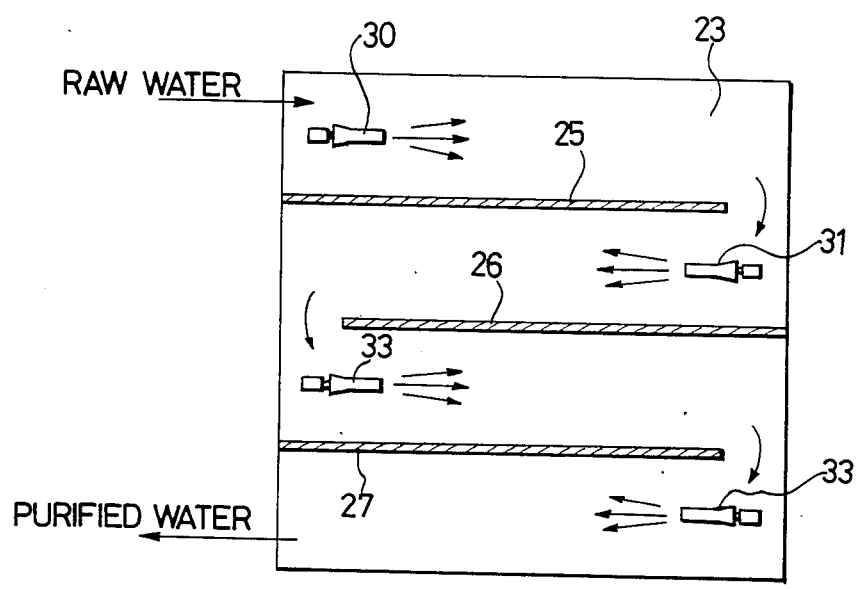

More specifically, in the case of a tank having a longitudinal dimension of not less than 3 meters and a transverse dimension of not greater than 5 meters, the aerobic biological treatment can be carried out without partitioning the tank. This can be accomplished by installing the aerator in such a way that it is adjacent to a transverse sidewall of the tank and the bubble-containing stream is discharged in a direction parallel to the longitudinal sidewalls of the tank. However, in the case of a rectangular tank having a transverse dimension of greater than 5 meters, partitions 24–27 should be disposed in the tank 22 or 23 so as to divide it into a plurality of rectangular sections having a width of not greater than 5 meters, as illustrated in FIGS. 8 and 9. In the respective sections so formed, aerators 28–33 are installed in such a way that the discharge orifice is located at a distance of not less than 3 meters from the opposite sidewall of the tank 22 or 23. Although one aerator is installed in each section in the illustrated figures, an aerator need not be installed in all of the sections if the oxygen content of the waste water supplied to the section is sufficiently high from the aeration in the preceding sections.

Of course, the aforesaid partitions may comprise the sidewalls of the tank. As illustrated in FIGS. 8 and 9, the partitions 24–27 need only prevent the free flow of the waste water within the tank to some extent, and it is not required to partition the tank perfectly so as to prevent the waste water from moving from one section to another. That is, the only function that the partitions must perform is to permit the waste water in each section to be fully agitated and uniformly aerated by the bubble-containing stream.

In the treatment method of the present invention, the dimensions of the tank have a very important significance. If the discharge orifice 8 is located at a distance of less than 3 meters from the opposite sidewall of the tank as measured in the direction of flow of the bubble-containing stream, the air bubbles will collide with one another more frequently and escape to the water surface owing to a vigorous tubulent flow, leading to insufficient dissolution of oxygen. The distance between the discharge orifice 8 and the opposite sidewall of the tank should preferably be about 7 to 18 meters from a practical point of view, although this depends on the transverse dimension.

If the tank is not provided with any partition parallel to the flow of the bubble-containing stream or if the distance between adjacent partitions is greater than 5 meters, the diffusion of the bubble-containing stream in the waste water will tend to lose its directionality and become non-uniform, leading to inadequate aeration in some areas. From a practical point of view, the distance between adjacent partitions are preferably of the order of 0.7 to 3 meters because this can provide a relatively high flow velocity in the direction of flow of the bubble-containing stream.

In the process of the present invention, the waste water within the tank is usually used as the liquid to be supplied to the aerator. However, raw waste may also be used. Where the waste water within the tank is supplied to the aerator, a more efficient biological treatment can be achieved because the flocs formed by the aggregation of microorganisms present in the tank are finely divided in the aerator and returned to the tank. Alternatively, the liquid supplied to the aerator may be previously treated with pressurized air to dissolve oxygen therein to a high concentration.

The bubble-containing stream discharged from the aerator preferably have as high a flow velocity as possible. Since the air bubbles present in the bubble-containing stream discharged from the aerator of the present invention are very minute, their rate of rise is low and little coalescence thereof occurs within the flow straightener. However, if the flow velocity is unduly low, it may be difficult to distribute air bubbles uniformly throughout the waste water within the tank, and the local stagnation of suspended matter and the accumulation of sediment at the bottom or corners of the tank will tend to occur. Accordingly, the bubble-containing stream should have a flow velocity of at least 1.5 meters per minute at the discharge orifice of the flow straightener, and a flow velocity of not less than 1.8 meters per minute is preferred.

In the aerobic biological treatment process of the present invention, a variety of conventionally known process steps such as pH adjustment, temperature control, removal of toxic substances, removal of excess fats and oils, addition of nutrients, and removal of excess flocs may be suitably carried out to create an environment suitable for the biological treatment.

The process of the present invention is applicable to the aerobic biological treatment of industrial waste water produced in the food, chemical, steel, fat and oil, and like industries, civil waste water from office buildings, schools, hospitals and the like, and organic waste water containing natural or artificial organic matter (such as sewage from cities and towns), but also to the treatment of various liquid media used in biotechnology, and the purification of lake water, among other applications.

According to the aerobic biological treatment process of the present invention, a large amount of minute air bubbles can be uniformly supplied throughout the waste water without causing coalescence of the bubbles, so that the oxygen dissolution efficiency can be markedly improved. Accordingly, it becomes possible to achieve an efficient aerobic biological treatment and thereby increase the treating capacity. Moreover, the supply of water and air to the aerator can be controlled separately, and the dispersibility of air bubbles in the water does not decrease even when the volume ratio of air to water at the outer nozzle is raised to the order of 2/1 to 3/1. Thus, according to the variation in the load characteristics of raw waste water, oxygen can be supplied in an amount corresponding to the oxygen requirement, and this can also bring about an energy-saving effect. Furthermore, if the waste water within the tank is circulated by supplying it to the aerator, the flocs of aerobic microorganisms present in the waste water can be finely divided to further improve the efficiency of the aerobic biological treatment.

The present invention is further illustrated by the following examples:

EXAMPLES 1-2, COMPARATIVE EXAMPLES 1-2 AND REFERENCE EXAMPLES 1-4

An aerator of the construction illustrated in FIGS. 1 or 2 was installed at the bottom of a tank measuring 2 m in width, 18 m in length and 3.5 m in depth, and used to treat waste water from a marine product processing factory. The various dimensions of the aerator used in each example are shown in Table 1. However, the flow straightener of the aerator used in Comparative Example 1 comprised a straight tube, while the flow straightener of the aerator used in Comparative Example 2 had a tubular form whose internal diameter was gradually increased from the inlet toward the discharge orifice.

The initial BOD of the raw waste water was about 1100 ppm on the average. A bubble-containing stream was discharged from the aerator by supplying the waste water through the liquid inlet at a flow rate of 0.7 m$^3$/min. and a pressure of 2.1 kg/cm$^2$G, and by supplying air at a flow rate of 2.1 Nm$^3$/min. and a pressure of 0.7 kg/cm$^2$G. Eight hours after the start of the treatment, the state of the waste water treatment was evaluated. The results thus obtained are shown in Table 1.

The evaluation of various parameters was carried out according to the following procedures:
1. BOD: Determined according to JIS K0102.
2. Dissolved oxygen concentration: Measured with a DO meter (manufactured by Denki Kagaku Kogyo K.K.).
3. Oxygen dissolution efficiency: Air bubbles present in the waste water were collected and combined. The oxygen concentration in the gas thus obtained was determined and used to calculate the oxygen dissolution efficiency.
4. Flow velocity: Measured with a propeller type flowmeter.
5. State of air bubbles: The state of foaming caused on the water surface by air bubbles was observed visually and rated on the following basis:
   "No coalescence of bubbles"=Bursting of air bubbles having a diameter of the order of several millimeters was observed evenly on the water surface.
   "Slight coalescence of bubles"=In addition to the aforesaid bursting of minute air bubbles, bursting of large air bubbles having a diameter of the order of 2-3 cm or occasionally 5-7 cm was observed.
   "Marked coalescence of bubles"=Bursting of large air bubbles was continually or periodically observed in one or more places of the water surface.

TABLE 1

Comparative

TABLE 1-continued

| | Example 1 | Example 2 | Example 1 |
|---|---|---|---|
| Shape of aerator | FIG. 1[*1] | FIG. 2[*2] | (FIG. 1)[*3] |
| Internal diameter, A, of outer nozzle (mm) | 50 | 50 | 50 |
| Internal diameter of inlet of flow straightener (mm) | 490 | 490 | 240 |
| Internal diameter, B, of discharge orifice of flow straightener (mm) | 240 | 240 | 240 |
| A/B | 0.2 | 0.2 | 0.2 |
| Total length, L, of flow straightener (mm) | 2000 (40A) | 2000 (40A) | 2000 (40A) |
| State of air bubbles | No coalescence of bubbles | No coalescence of bubbles | Marked coalescence of bubbles |
| Flow velocity of bubble-containing stream at discharge orifice of flow straightener (m/sec.) | 0.4 | 0.5 | 0.4 |
| Dissolved oxygen in waste water (ppm) | 2.0 | 2.0 | 0.8 |
| Oxygen dissolution efficiency (%) | 29 | 32 | 9 |
| BOD of purified water (ppm) | 3 | 3 | 350 |

| | Comparative Example 2 | Reference Example 1 | Reference Example 2 | Reference Example 3 | Reference Example 4 |
|---|---|---|---|---|---|
| | (FIG. 1)[*3] | FIG. 1 | FIG. 1 | FIG. 1 | FIG. 1 |
| | 50 | 50 | 50 | 50 | 25 |
| | 240 | 1300 | 130 | 490 | 200 |
| | 1000 | 625 | 62.5 | 240 | 75 |
| | 0.05 | 0.08 | 0.8 | 0.2 | 0.33 |
| | 2400 (48A) | 2400 (48A) | 2400 (48A) | 750 (15A) | 3000 (120A) |
| | Marked coalescence of bubbles | Slight coalescence of bubbles | Slight coalescence of bubbles | Slight coalescence of bubbles | Slight coalescence of bubbles |
| | 0.2 | 0.1 | 0.5 | 0.4 | 0.4 |
| | 0.1 | 0.5 | <0.1 | 0.8 | 0.7 |
| | 6 | 15 | 10 | 16 | 15 |
| | 450 | 200 | 450 | 140 | 200 |

[*1] The internal diameter of the flow straightener was continuously reduced from the inlet to the middle point, and remained constant from the middle point to the discharge orifice.
[*2] The overall length of the inner tube was 1400 mm, the internal diameter of its inlet was 180 mm, the internal diameter of its discharge orifice was 125 mm, and the internal diameter was continuously reduced from the inlet to the discharge orifice.
[*3] Only the flow straightener was different in shape.

EXAMPLE 3

Waste water from a milk bottle washing process was treated by using treating equipment as illustrated in FIGS. 9 and 10. The BOD and SS of this organic waste water fluctuated heavily in the range of 800–1400 ppm and 66–190 ppm, respectively.

The biological treatment tank 23 comprised a tank having an effective depth of 6.2 m, a length of 12.5 m and a width of 9.0 m. Using three partitions 25–27 having a length of 12 m, this biological treatment tank 23 was divided into four adjacent sections having a width of 2.2 m and communicating with one another, as illustrated in FIG. 9.

At the bottom of the sections of the biological treatment tank 23, aerators 30–33 similar to that used in Example 1 were installed. A bubble-containing stream was discharged by supplying the waste water within the biological treatment tank at a flow rate of 0.7 m³/min. and a pressure of 2.1 kg/cm²G, and by supplying air as the gas at a flow rate of 2.1 Nm³/min. Almost no escape of air bubbles due to their coalescence was observed, and good dispersion of minute air bubbles in the waste water was achieved. In this case, the flow velocity of the bubble-containing stream at the discharge orifice of the flow straightener was 0.4 m/sec. When the distribution of the flow velocity in the direction of flow of the bubble-containing stream was observed at a depth of 3 m below the water surface, the flow velocity was 0.4, 0.2 and 0.08 m/sec. at points 3, 4 and 5 m apart, respectively, from the discharge orifice 8 of the flow straightener.

In this treating equipment, the aforesaid organic waste water was treated under the following conditions: The organic waste water was introduced through an organic waste water inlet into the tank 23 at a flow rate of 250 liters per minute. By exposure to the bubble-containing stream discharged from the aerator 30 installed in the first section, the organic waste water was aerated and, at the same time, mixed by agitation. Then, the organic wasted water was conducted to the second section, where it was again aerated and agitated by the action of the aerator 31. After passing through the third section, the organic waste water was finally treated with the bubble-containing stream discharged from the aerator 33 into the fourth section. Thereafter, the organic waste water was withdrawn from the tank 23.

The BOD of the organic waste water, which had initially been in the range of 800–1400 ppm, was finally reduced to 25 ppm. Thus, there was obtained purified water of very good quality.

EXAMPLES 4–5 AND COMPARATIVE EXAMPLES 3–6

Waste water from a fish oil processing factory was treated by using a biological treatment tank in which an aerator in accordance with the present invention was installed. The average BOD and SS of this organic waste water were 1100 ppm and 220 ppm, respectively. Its temperature was 25°–30° C.

The biological treatment tank comprised a tank having an effective depth of 3.8 m, a length of 25 m, and a width of 6 m. By disposing suitable partitions within the biological treatment tank, the distance between the discharge orifice of the flow straightener and the opposite wall of the tank as measured in the direction of flow of the bubble-containing stream was varied in three steps (i.e., 18 m, 12 m and 2 m), and the width of the water tank was varied in three steps (i.e., 6 m, 2 m and 1.5 m).

The aerator used in these examples was the same as used in Example 1, but the vertical position (or depth) at which it was installed within the tank was also varied. Under these conditions, a bubble-containing stream was discharged from the aerator by supplying air thereto in such an amount as to give a gas-to-liquid (or air-to-waste water) volume ratio of 3/1.

Thus, the aerobic biological treatment of the organic waste water was continued for 20 hours, and the state of the waste water treatment was evaluated. The results thus obtained are shown in Table 2.

TABLE 2

| | Example 4 | Example 5 | Comparative Example 3 | Comparative Example 4 | Comparative Example 5 | Comparative Example 6 |
|---|---|---|---|---|---|---|
| Depth of aerator (m) | 3.5 | 3.5 | 1.5 | 3.5 | 3.5 | 3.5 |
| Distance between discharge | 18 | 12 | 12 | 2 | 12 | 12 |

TABLE 2-continued

|  | Example 4 | Example 5 | Comparative Example 3 | Comparative Example 4 | Comparative Example 5 | Comparative Example 6 |
|---|---|---|---|---|---|---|
| orifice of flow straightener and opposite wall of tank (m) |  |  |  |  |  |  |
| Width of tank (m) | 2 | 1.5 | 2 | 2 | 6 | 2 |
| Flow velocity of bubble-containing stream at discharge orifice of flow straightener (m/sec) | 0.4 | 0.4 | 0.4 | 0.4 | 0.4 | 0.02 |
| State of air bubbles | No coalescence of bubbles | No coalescence of bubbles | Slight coalescence of bubbles | Marked coalescence of bubbles | Slight coalescence of bubbles | Marked coalescence of bubbles |
| Dissolved oxygen in waste water (ppm) | 2.0 | 2.0 | 0.8 | 0.2 | 0.4 | <0.1 |
| Oxygen dissolution efficiency (%) | 29 | 32 | 16 | 10 | 13 | 5 |
| BOD of purified water (ppm) | 15 | 15 | 150 | 220 | 100 | 800 |

What is claimed is:

1. An aerator comprising a jet stream generator for ejecting a gas and a liquid in a mixed state from a nozzle, and a tubular flow straightener for mixing the bubble-containing stream ejected from the nozzle with ambient water and discharging the resulting mixture from the discharge orifice thereof, characterized in that said jet stream generator has a liquid inlet, at least one gas inlet, an outer nozzle and at least one inner nozzle, said liquid inlet communicates with the internal space of said jet stream generator by way of said inner nozzle, said flow straightener has a tubular form whose internal diameter is reduced from the inlet toward the discharge orifice through at least a part of its length, and said outer nozzle is disposed so as to be substantially coaxial with said flow straightener and to have its tip located in the neighborhood of the inlet of said flow straightener.

2. The aerator of claim 1 wherein, when the internal diameter of the tip of said outer nozzle is represented by A and the smallest internal diameter of said flow straightener is represented by B, A/B has a value of 0.1 to 0.5 and the overall length, L, of said flow straightener is in the range of 20A to 1000A.

3. The aerator of claim 1 wherein said flow straightener includes an inner tube having a tubular form similar to that of the outer tube of said flow straightener and disposed coaxially therein, and the inlet of said inner tube is substantially flush with the inlet of the outer tube of said flow straightener.

4. The aerator of claim 1 or 3 wherein said jet stream generator has first and second gas inlets and first and second inner nozzles and wherein the internal space of said jet stream generator is divided by said second inner nozzle into a first chamber communicating with said first gas inlet and communicating with said liquid inlet by way of said first inner nozzle, and a second chamber communicating with said second gas inlet and said outer nozzle.

5. The aerator of claim 1 or 3 wherein said jet stream generator includes a baffle disposed between said inner nozzle and said outer nozzle.

6. The aerator of claim 1 or 3 wherein said jet stream generator includes fragmentation means for fragmenting the coarse particles present in the liquid supplied through said liquid inlet, said fragmentation means being disposed between said liquid inlet and said inner nozzle.

7. A process for the aerobic biological treatment of waste water placed in a tank which comprises the steps of (a) providing an aerator comprising a jet stream generator for ejecting a gas and a liquid in a mixed state from a nozzle, and a tubular flow straightener for mixing the bubble-containing stream ejected from the nozzle with ambient water and discharging the resulting mixture from the discharge orifice thereof, characterized in that said jet stream generator has a liquid inlet, at least one gas inlet, an outer nozzle and at least one inner nozzle, said liquid inlet communicates with the internal space of said jet stream generator by way of said inner nozzle, said flow straightener has a tubular form whose internal diameter is reduced from the inlet toward the discharge orifice through at least a part of its length, and said outer nozzle is disposed so as to be substantially coaxial with said flow straightener and to have its tip located in the neighborhood of the inlet of the flow straightener;

(b) installing said aerator within said tank in such a way that said aerator is located at a depth of at least 2 meters below the water surface and the discharge orifice of said flow straightener is located at a distance of not less than 3 meters from the opposite wall of said tank as measured in the direction of flow of the bubble-containing stream discharged from said discharge orifice;

(c) disposing two partitions within said tank in such a way that said partitions are substantially parallel to the bubble-containing stream discharged from said discharge orifice, said partitions define a section having a width of not greater than 5 meters, and said aerator is located substantially equidistant from said partitions; and (d) supplying a gas and a liquid to said aerator so as to produce a bubble-containing stream having a flow velocity of not less than 1.5 meters per minute at said discharge orifice.

* * * * *